(12) United States Patent
Winter

(10) Patent No.: US 11,707,805 B2
(45) Date of Patent: Jul. 25, 2023

(54) SYSTEM AND METHOD FOR LASER DRILLING OF SHAPED COOLING HOLES

(71) Applicant: United Technologies Corporation, Farmington, CT (US)

(72) Inventor: Michael Winter, New Haven, CT (US)

(73) Assignee: Raytheon Technologies Corporation, Farmington, CT (US)

(*) Notice: Subject to any disclaimer, the term of this patent is extended or adjusted under 35 U.S.C. 154(b) by 959 days.

(21) Appl. No.: 16/220,402

(22) Filed: Dec. 14, 2018

(65) Prior Publication Data
US 2020/0189040 A1 Jun. 18, 2020

(51) Int. Cl.
*B23K 26/384* (2014.01)
*B23K 26/06* (2014.01)
*F01D 5/18* (2006.01)

(52) U.S. Cl.
CPC ........ *B23K 26/384* (2015.10); *B23K 26/0648* (2013.01); *F01D 5/186* (2013.01)

(58) Field of Classification Search
CPC .... B23K 26/389; B23K 26/082; B23K 26/40; B23K 26/705; B23K 26/0622; B23K 26/0736; B23K 26/361; B23K 26/384; B23K 26/0624; B23K 26/067; B23K 26/16; B23K 26/382; B23K 26/388; B23K 26/00; B23K 26/03; B23K 26/032; B23K 26/04; B23K 26/043; B23K 26/06; B23K 26/0604; B23K 26/064; B23K 26/0643; B23K 26/0648; B23K 26/0652; B23K 26/066; B23K 26/0665; B23K 26/073; B23K 26/08

USPC .............. 219/121.67, 121.73, 121.75, 121.7, 219/121.71, 121.68, 121.72, 121.6, 219/121.61, 121.69, 121.74, 121.76, 219/121.78, 121.79
See application file for complete search history.

(56) References Cited

U.S. PATENT DOCUMENTS

| | | | |
|---|---|---|---|
| 5,043,553 A | 8/1991 | Corfe et al. | |
| 5,683,600 A | 11/1997 | Kelley et al. | |
| 6,621,060 B1 | 9/2003 | Nantel et al. | |
| 8,525,073 B2* | 9/2013 | Quitter | B23K 26/046 219/121.75 |
| 9,093,822 B1* | 7/2015 | Chann | H01S 5/4012 |
| 9,250,390 B2 | 2/2016 | Muendel et al. | |

(Continued)

FOREIGN PATENT DOCUMENTS

| | | |
|---|---|---|
| JP | 2015124115 A | 7/2015 |
| WO | 2015/098388 A1 | 7/2015 |
| WO | 2018/012327 A1 | 1/2018 |

OTHER PUBLICATIONS

European Search Report dated Jun. 19, 2020 issued for European Patent Application No. 19215802.0.

(Continued)

*Primary Examiner* — Chris Q Liu
(74) *Attorney, Agent, or Firm* — Bachman & LaPointe, P.C.

(57) ABSTRACT

A laser hole drilling system. The system includes a laser source that generates a laser beam along an optical axis, a cylindrical lens along the optical axis downstream of the laser source, and a spherical lens downstream of the cylindrical lens, the spherical lens offset from the optical axis to provide an anamorphic optical train to generate an asymmetric teardrop shaped energy distribution at a focal plane.

5 Claims, 4 Drawing Sheets

(56) References Cited

U.S. PATENT DOCUMENTS

| | | | |
|---|---|---|---|
| 10,072,971 B2 | 9/2018 | Dane et al. | |
| 2004/0218164 A1* | 11/2004 | Kohno | G03F 7/70075 |
| | | | 355/71 |
| 2007/0206260 A1* | 9/2007 | Mochizuki | G02B 26/101 |
| | | | 359/204.1 |
| 2009/0071947 A1* | 3/2009 | Sekiguchi | G02B 19/0052 |
| | | | 219/121.75 |
| 2010/0110556 A1* | 5/2010 | Chann | H01S 5/4062 |
| | | | 359/619 |
| 2010/0126973 A1 | 5/2010 | Frye | |
| 2011/0305256 A1* | 12/2011 | Chann | G02B 27/0905 |
| | | | 372/75 |
| 2012/0132628 A1* | 5/2012 | Kosmowski | B23K 26/146 |
| | | | 219/121.67 |
| 2013/0269354 A1* | 10/2013 | Starkweather | F23M 5/08 |
| | | | 60/754 |
| 2015/0331245 A1* | 11/2015 | Tayebati | G02B 5/18 |
| | | | 359/634 |
| 2016/0167174 A1 | 6/2016 | Unger et al. | |
| 2018/0010484 A1 | 1/2018 | Reed et al. | |
| 2019/0145623 A1 | 5/2019 | Fukimoto et al. | |

OTHER PUBLICATIONS

European Search Report dated Jul. 2, 2020 issued for European Patent Application No. 19216207.1.
European Extended Search Report dated Oct. 8, 2020 issued for European Patent Application No. 19216207.1.
U.S. Office Action dated Feb. 17, 2023 for related U.S. Appl. No. 16/220,415.

* cited by examiner

SYSTEM AND METHOD FOR LASER DRILLING OF SHAPED COOLING HOLES

BACKGROUND

The present disclosure relates to a method for laser drilling, and more particularly to a method for laser hole drilling of shaped cooling holes for gas turbine engine components.

Gas turbine engines typically include a compressor section to pressurize airflow, a combustor section to burn a hydrocarbon fuel in the presence of the pressurized air, and a turbine section to extract energy from the resultant combustion gases. Gas path components, such as turbine blades, often include cooling that may be accomplished by external film cooling, internal air impingement, and forced convection either separately or in combination. In forced convection cooling, compressor bleed air flows through internal chambers to continuously remove thermal energy. The compressor bleed air enters the internal chambers through one or more inlets to the internal chambers, which then discharge though various hole exits.

Advances in manufacturing have facilitated significantly smaller and more complex internal passages. The cooling air holes are drilled in pre-determined patterns and are contoured to ensure adequate cooling of the airfoil. The cooling air holes duct cooling air from passages on the interior of the airfoil through the hot walls to the exterior. The cooling air provides transpiration cooling as the air passes through the wall and, after the air is discharged from the airfoil, provides film cooling with a film of air on the exterior. The film of cooling air provides a barrier between the airfoil and the hot, working medium gasses.

One process to drill the holes utilizes a laser beam that burns through the wall of the airfoil to form a hole that provides a satisfactory conduit for cooling air. Laser hole drilling is performed by focusing a laser (typically 1026 nm) onto the gas turbine component.

Many components, however, utilize shaped cooling holes. Shaped cooling holes typically include a meter hole with a portion that may not penetrate through the wall. Shaped cooling holes are produced through the use of machining processes such as EDM, which is of a significantly higher cost than laser hole drilling. This issue may drive component design to avoid shaped cooling holes.

SUMMARY

A laser hole drilling system according to one disclosed non-limiting embodiment of the present disclosure includes a laser source that generates a laser beam along an optical axis; a cylindrical lens along the optical axis downstream of the laser source; and a spherical lens downstream of the cylindrical lens to provide an anamorphic optical train, the spherical lens offset from the optical axis to generate an asymmetric teardrop shaped energy distribution at a focal plane.

A further embodiment of any of the foregoing embodiments of the present disclosure includes that the spherical lens is located at an angle with respect to the optical axis.

A further embodiment of any of the foregoing embodiments of the present disclosure includes that the cylindrical lens provides a 1-D convergence of the laser beam.

A further embodiment of any of the foregoing embodiments of the present disclosure includes that the cylindrical lens focuses the laser beam into a line.

A further embodiment of any of the foregoing embodiments of the present disclosure includes that the spherical lens introduces a distortion in the line.

A further embodiment of any of the foregoing embodiments of the present disclosure includes that the spherical lens de-magnifies the line.

A component for a gas turbine engine according to one disclosed non-limiting embodiment of the present disclosure includes a surface with a laser drilled asymmetric teardrop shaped cooling hole.

A further embodiment of any of the foregoing embodiments of the present disclosure includes that the surface is a wall of a turbine blade.

A method for laser drilling an asymmetric teardrop shaped cooling hole in a component for a gas turbine engine, the method according to one disclosed non-limiting embodiment of the present disclosure includes focusing a laser beam into a line; and de-magnifying the line to generate an asymmetric teardrop shaped energy distribution at a focal plane.

A further embodiment of any of the foregoing embodiments of the present disclosure includes directing the laser beam through a cylindrical lens.

A further embodiment of any of the foregoing embodiments of the present disclosure includes directing the laser beam through a spherical lens.

A further embodiment of any of the foregoing embodiments of the present disclosure includes positioning the spherical lens at an angle with respect to an optical axis.

A further embodiment of any of the foregoing embodiments of the present disclosure includes offsetting the spherical lens from an optical axis.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
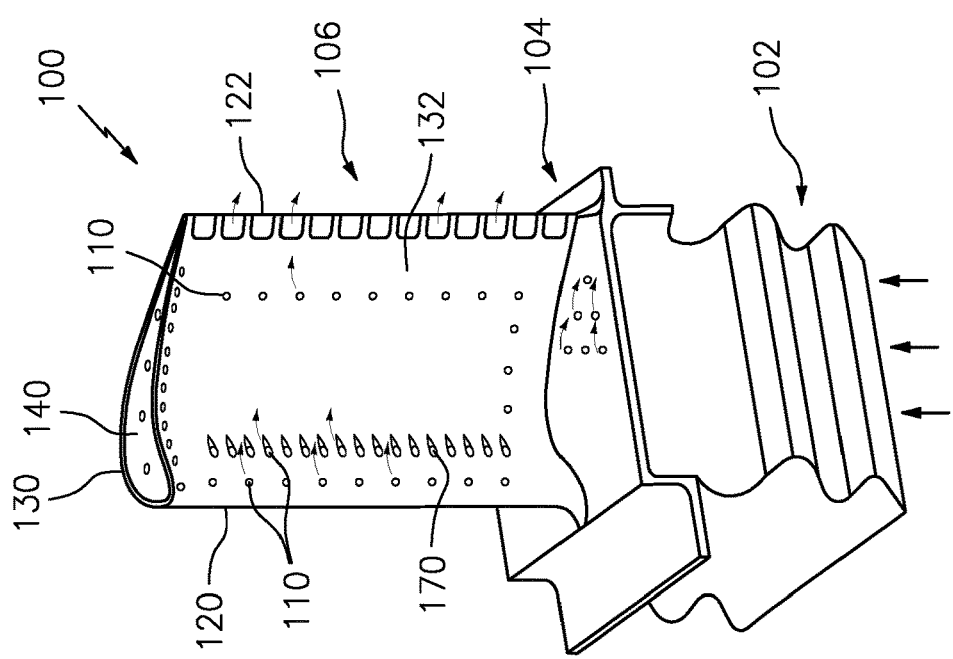
FIG. 1 is a perspective view of an airfoil as an example component.

FIG. 1 schematically illustrates an example blade 100 for a gas turbine engine such as a turbine blade. The blade 100 generally includes a root 102, a platform 104 and an airfoil 106 (also shown in FIGS. 2 and 3). The platform 104 separates a gas path side inclusive of the airfoil 106 and a non-gas path side inclusive of the root 102. The platform 104 generally separates the root 102 and the airfoil 106 to define an inner boundary of a gas path. The airfoil 106 defines a blade chord between a leading edge 120, which may include various forward and/or aft sweep configurations, and a trailing edge 122. A first wall 130 may be convex to define a suction side, and a second wall 132 may be concave to define a pressure side are joined at the leading edge and at the axially spaced trailing edge. A blade tip 140 extends between the walls 130, 132 opposite the platform 104. It should be appreciated that the tip 96 may include a recessed portion.

Figure 2:
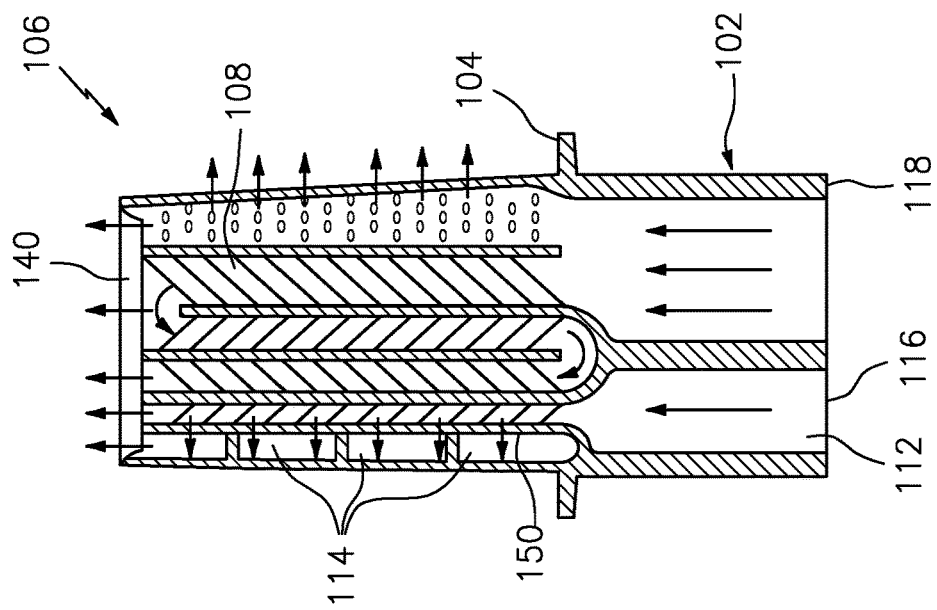
FIG. 2 is a schematic cross-section view of the airfoil of FIG. 1 showing the internal architecture.
Figure 3:
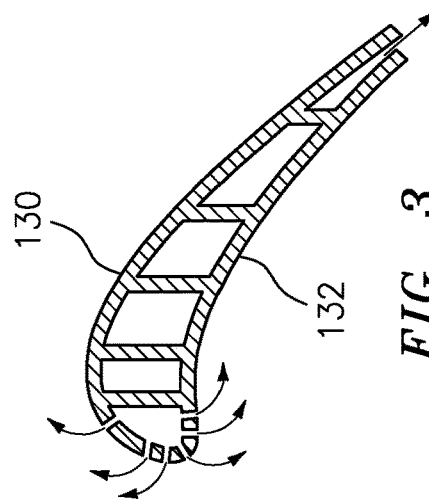
FIG. 3 is a schematic lateral cross-section view of the airfoil of FIG. 1.

To resist the high temperature stress environment in the gas path of a turbine engine, each blade 100 may be formed by casting to include an array of internal passageways 108 (also shown schematically in FIG. 2) that communicate with a multiple of holes 110 (illustrated schematically) that direct cooling air over an outer surface of the airfoil 106, here exemplified by the leading edge 98 (also shown schematically in FIG. 3). It should be appreciated that although a blade 100 with cooling holes will be described and illustrated in detail as one example, other components including, but not limited to, vanes, turbine shrouds, end walls and other components will also benefit herefrom.

With reference to FIG. 2, the array of internal passageways 108 includes a feed passage 112 that communicates airflow into a multiple of leading edge chambers 114 within the blade 100. The feed passage 112 generally receives cooling flow through at least one inlet 116 within a base 118 of the root 102. The multiple of leading edge chambers 114 of a leading edge cavity 122 generally receives cooling flow from the feed passage 112 through respective crossover passages 150. The multiple of holes 110 provide for cooling air egress to an external surface of the blade 100. It should be appreciated that although particular features are delineated within certain general areas, the features may be otherwise arranged or intermingled and still not depart from the disclosure herein. It should also be appreciated that various feed passage architectures; cavities and internal feature arrangements, e.g., pedestals, chevrons, pin fins, chevrons, etc., for the array of internal passageways 108 may also be provided.

Figure 4:
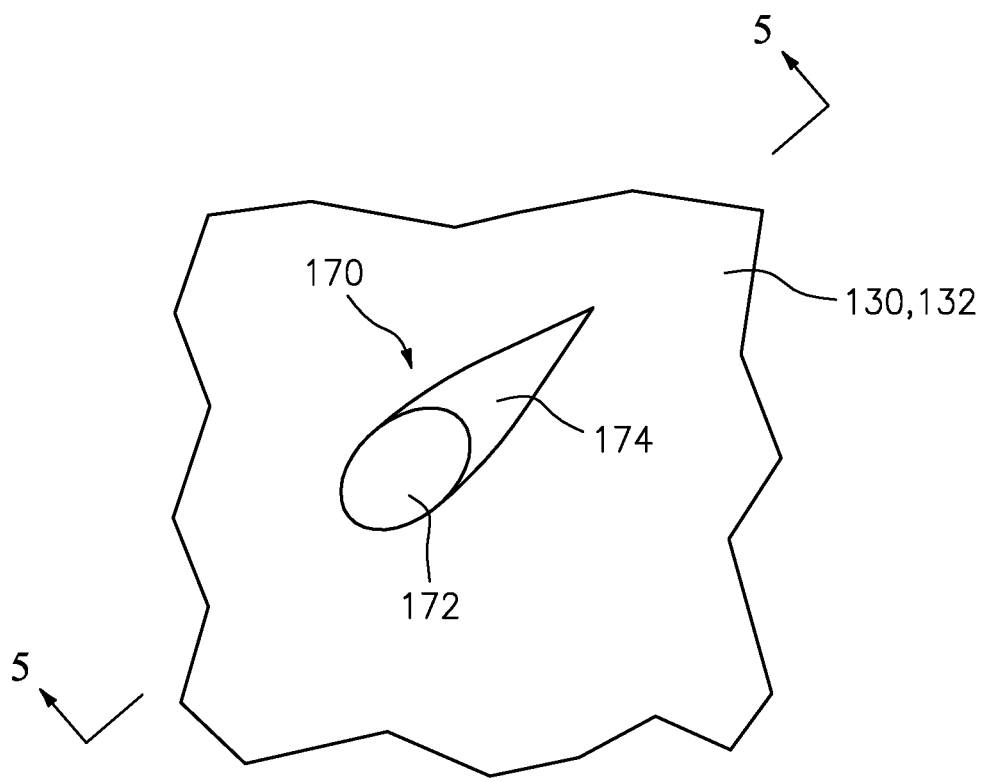
FIG. 4 is a top plan view of a shaped cooling hole.
Figure 5:
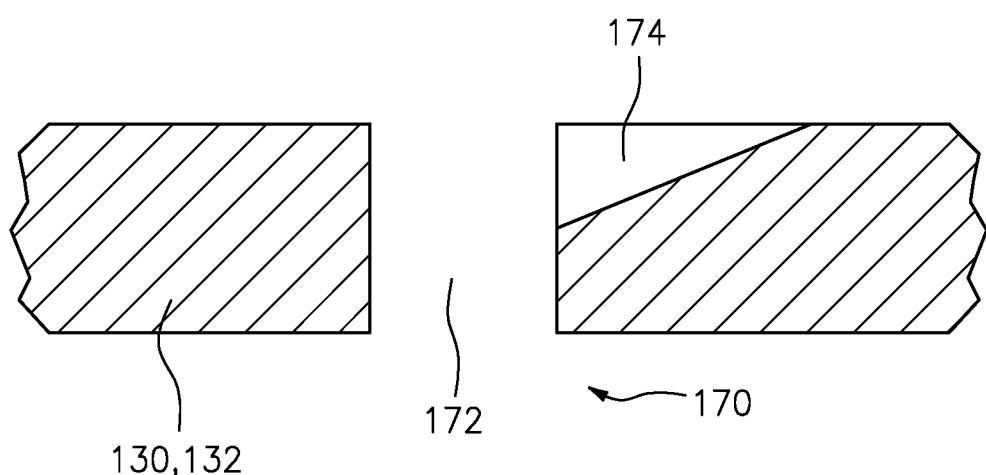
FIG. 5 is a sectional view of the shaped cooling hole taken along line 5-5 in FIG. 4.

The multiple of holes 110 may include a multiple of shaped cooling holes 170 that communicate the cooling airflow from the internal cooling circuit through the wall of the blade 100 to provide external film cooling which allow exit of the internal cooling flow used in forced convection cooling. The shaped cooling holes 170 include a metering hole 172 and a trailing portion 174 that may not penetrate and/or may be angled with regard the walls 130, 132 of the blade 100 to form an asymmetric teardrop shape (FIGS. 4 and 5).

Figure 6:
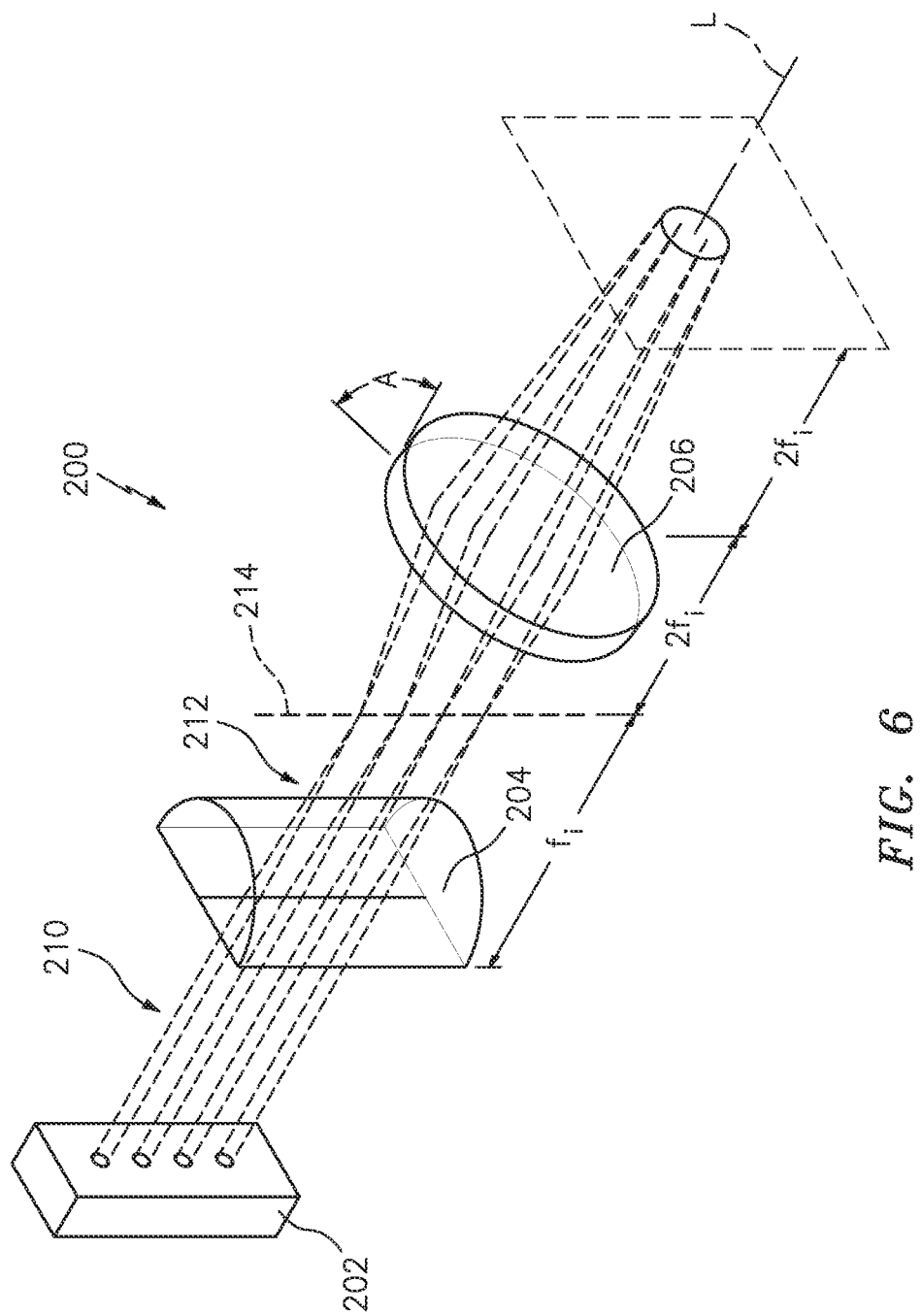
FIG. 6 is a schematic view of a shaped cooling hole laser drilling system.

With reference to FIG. 6, a laser hole drilling system 200 includes a laser source 202, a cylindrical lens 204, and a spherical lens 206 along an axis L to provide an anamorphic optical train. The laser beam is emitted from the laser source 202 according to a Gaussian profile. A Gaussian beam is a beam of electromagnetic radiation whose transverse electric field and intensity (irradiance) distributions are described by Gaussian functions. The spherical lens 206 is located off the optical axis L thereby introducing an asymmetric teardrop shaped energy distribution at a focal plane to drill the shaped cooling hole 170.

The laser beam 210 propagates through the cylindrical lens 204 providing a 1-d convergence 212 of optical rays focusing the laser beam 210 into the line 214. If this line 214 is then de-magnified and imaged onto the work piece, a high power spot in the form of the line 214 on the work piece. Locating the spherical lens 206 offset from the optical axis L introduces distortion to the de-magnified line 214 thereby forming a teardrop shaped energy distribution in 2-dimensions on the work piece. The spherical lens 206 is also located at an angle A with respect to the optical axis L to control the length of the line 214. Both a change in angle and a change in offset will intentionally introduce a distortion in the resultant focal spot. One or both mechanisms can be utilized to create the desired effect. By controlling the combination of laser energy, degree of focusing, and dimensional offset from the optical axis L, the energy distribution can be spatially tailored to only provide hole breakthrough, e.g., metering hole 172 at a portion of the teardrop shape cooling holes 170. That is, the breakthrough of the wall 130, 132 forms a metering hole 172 while the trailing portion 174 does not breakthrough (FIG. 8).

Figure 7:
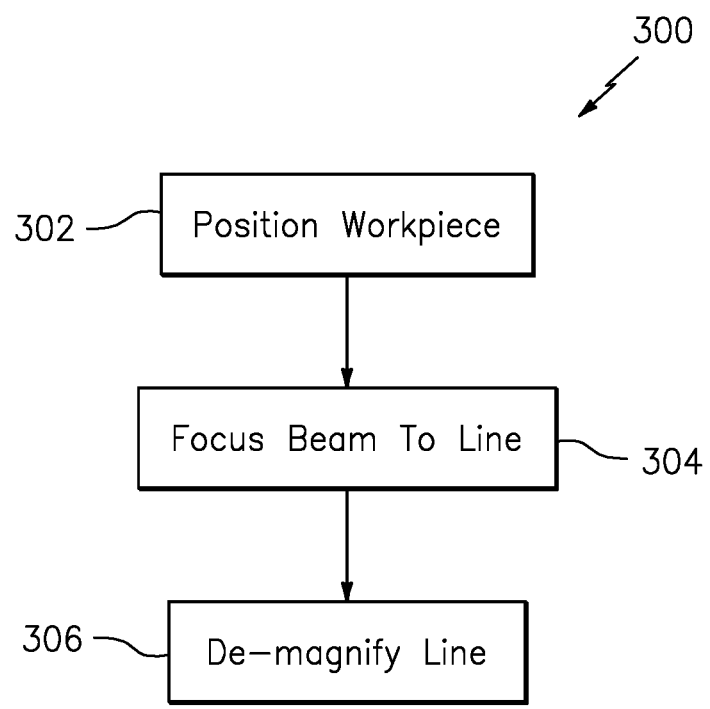
FIG. 7 is a block diagram of a method for laser drilling shaped cooling holes.

With reference to FIG. 7, an example method 300 for laser drilling the shaped cooling hole 170. The steps of the method 300 are schematically disclosed in terms of functional block diagrams as a flowchart of steps. It should be appreciated that alternative of addition steps may be provided without departing from the teaching herein.

Initially, a component, such as the blade 100, is positioned (302) with respect to the laser hole drilling system 200. Next, the laser beam is focused (304) to form the line 214. That is, the beam intensity is distributed into an oval, e.g., line, where the semi-minor axis is defined by the focal characteristics of the cylindrical lens and the semi-major axis is defined by the initial beam diameter.

Then, the line 214 is de-magnified to generate an asymmetric teardrop shaped energy distribution at a focal plane. The spherical lens 206 is positioned at an angle with, and/or an offset, with respect to the optical axis. The asymmetric teardrop shaped energy distribution thereby drills the teardrop shape cooling hole 170 at the focal plane. By controlling the focal plane the breakthrough of the wall 130, 132 forming the metering hole 172 while the trailing portion 174 does not breakthrough the wall 130, 132.

The method for laser drilling the shaped cooling hole is inexpensive and readily incorporated into existing and future components.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed:

1. A laser hole drilling system, comprising:
a laser source that generates a laser beam along an optical axis (L);
a cylindrical lens along the optical axis (L) downstream of the laser source; and
a spherical lens downstream of the cylindrical lens to provide an anamorphic optical train, the spherical lens having a central axis that is offset from the optical axis (L) to generate an asymmetric teardrop shaped energy distribution at a focal plane;
wherein the spherical lens is located at an angle (A) with respect to the optical axis (L); the angle (A) is defined between a plane of the spherical lens and the optical axis L, and is less than 90°.

2. The system as recited in claim 1, wherein the cylindrical lens provides a 1-D convergence of the laser beam.

3. The system as recited in claim 2, wherein the cylindrical lens focuses the laser beam into a line.

4. The system as recited in claim 3, wherein the spherical lens introduces a distortion in the line.

5. The system as recited in claim 3, wherein the spherical lens de-magnifies the line.

* * * * *